3,799,985
N,N-BIS(2-HYDROXYETHYL)-3,4,5-TRIMETHYL-ANILINE

Wallace A. Erickson, Chicago, Ill., assignor to Wallace A. Erickson & Company, Chicago, Ill.
No Drawing. Filed Nov. 15, 1971, Ser. No. 199,016
Int. Cl. C07c 91/06
U.S. Cl. 260—573    1 Claim

ABSTRACT OF THE DISCLOSURE

N,N-bis (2-hydroxyethyl)-3,4,5 trimethyl aniline has unique utility as an accelerator for free radical polymerizations.

---

This invention relates to new compounds comprising the reaction products of certain substituted anilines with ethylene oxide. More specifically, it relates to the reaction of either 3,4-dimethyl aniline or 3,4,5-trimethyl aniline with ethylene oxide to form N,N-bis(2-hydroxyethyl)-3,4,-xylidine or N,N-bis(2-hydroxyethyl)-3,4,5-trimethyl aniline, respectively, the method for producing such new compositions of matter, and the use of such new compositions of matter as accelerators in systems generating free radicals for the polymerization of monomers to form plastics.

Aniline, as well as various substituted anilines, has heretofore been reacted with ethylene oxide to yield compositions which exhibit certain utilities. In J. Chem. Soc. 183–91 (1949), W. C. J. Ross described the production of (I.) N,N-di-(2-hydroxyethyl) aniline, M.P. 55, (II.) N,N-bis(2-hydroxyethyl)-m-toluidine, M.P. 72–73° C., and (III.) N,N-bis(2-hydroxyethyl)-p-toluidine, M.P. 53–54° C., by the general reaction:

$$RNH_2 + (CH_2)_2O \xrightarrow[90°\ C.]{16\ hrs.} RN(CH_2CH_2OH)_2$$

The major application of these chemicals was as cytotoxic agents to slow the growth of tissues in a state of active proliferation, such as tumorous growth.

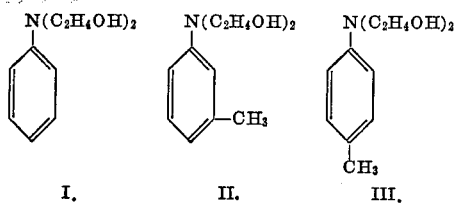

I.   II.   III.

J. L. Everett and W. C. J. Ross reported in J. Chem. Soc. 1972–83 (1949) that the cytotoxic activity of compounds similar to I–III is enhanced by attaching two reactive haloalkyl groups to an N atom, while substitution in the aromatic nucleus reduces biological activity. Several compounds were prepared by Everett and Ross using the same general reaction previously set out. One such product was N,N-bis(2-hydroxyethyl)-2,6-xylidine, an oil which decomposes upon distillation, and having the structure:

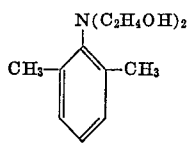

Farbenfabriken Bayer Akt.-Ses. in Ger. 1,063,375, Aug. 13, 1959 (Cl. 39b) reported the use of 5-bis(2-hydroxyethyl) amino-1,3-dimethylbenzene, or alternatively N,N-bis(2-hydroxyethyl) 3,5-dimethylaniline in the manufacture of high tear-resistant sheeting.

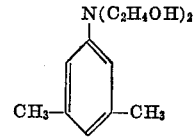

T. H. James reported in 55 Chem. Abst. 19561–64 (1961) the use of N,N-bis(2-hydroxyethyl)-3,5-dimethyl aniline, M.P. 103–104° C., in dye formation in color photography.

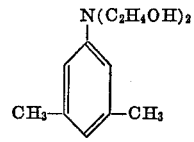

Also, N,N-bis-(β-hydroxyethyl)-3-methylaniline, M.P. 65–67° C., was reported in J.A.C.S. 82 1988–96 (1960).

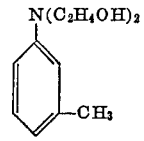

Many of the above referred to prior art compounds have been employed heretofore as accelerators or agents to promote the polymerization or copolymerization of various monomer(s) (e.g., see U.S. Pat. 2,558,139). The compositions of the present invention, however, are far more efficient as polymerization accelerators than, not only the above referred to compounds of somewhat similar structure, but also those acclerators in current commercial use as free radical generators for polymerization, such as dimethyl aniline, or dimethyl p-toluidiene. Although the chemical reaction of aniline or certain substituted anilines with ethylene oxide is known, the compounds of the present invention have not been previously described or suggested in the literature.

Although the compounds of the present invention may also be used as intermediates in the manufacture of new dyes, or as pharmaceuticals with cytotoxic activity as in the prior art compounds, the present invention's enhanced activity as an accelerator in free radical polymerization is completely unexpected from its chemical structure. In this latter application the compositions of the present invention react with such peroxides as dibenzoyl peroxide, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert.-butyl hydroperoxide, methyl amyl ketone peroxide, lauroyl peroxide, benzoyl peroxide, tert.-butyl perbenzoate, ditert-butyl diperphthalate, to generate rapidly free radicals to initiate polymerization without the external application of heat. For example, if 20 ml. methyl methacrylate monomer containing 0.5% N,N-bis(2-hydroxyethyl)-3,4 xylidine, as a promoter, is mixed with 40 grams finely divided methyl methacrylate polymer containing 1.0% dibenzoyl peroxide, as an activator, the resulting mass will begin to polymerize in not more than five minutes at room temperature and will be completely polymerized within ten minutes after the liquid and powder are mixed. The heat of polymerization will be very evident, raising the temperature of the mass of material to approximately 100° C. during this period. Other monomers which may be used include: ethylene, vinyl chloride, vinylidene chloride, acrylonitrile, vinyl acetate, methyl acrylate, ethyl methacrylate, isobutylene and styrene.

Where toxicity may be a problem, the present invention has additional advantages. Most aromatic amines, including substituted anilines, are considered somewhat toxic. On a weight basis substituted anilines are believed to exhibit about the same general order of toxicity. Therefore, those which are more efficient or effective as accelerators require lesser amounts in a formulation. The compositions of the present invention have such enhanced activity that 1/10 (or less) as much may be used as an accelerator to produce results otherwise comparable to prior art accelerators.

The compositions of the present invention are prepared by the reaction of ether 3,4 dimethyl aniline or 3,4,5 trimethyl aniline with ethylene oxide. It has been found that ortho substituted analogs of the compositions of the present invention, such as N,N - bis(2 - hydroxyethyl) 2,6 xylidine, do not function as accelerators, and that the methyl group in the para position is most effective. Substitution of a methyl group into the meta position adds to the efficiency of the compound. Therefore, N,N-bis (2-hydroxyethyl)-3,4,5 trimethyl aniline is the most efficient accelerator of all possible combinations of methyl groups in the series, since it has two methyl groups in the meta position, but no methyl groups in the ortho positions.

The following examples will serve to illustrate the preparation of the compositions of the present invention, but it should be understood that the examples are for illustrative purposes and are not intended as placing any unnecessary limitation on the scope of the present invention.

EXAMPLE I

Place 121.2 grams (1.0 mole) 3,4 dimethyl aniline in a 500 ml. Erlenmeyer flask. Add 92.4 (2.1 moles) ethylene oxide. Stir until the crystals have dissolved (10 minutes), adding ethylene oxide to compensate for evaporation as necessary to maintain the correct weight. Transfer the solution to an all stainless steel Parr pressure vessel reactor of 310 ml. capacity fitted with a pressure gauge and rupture disk. Close the reactor and place it in a water bath. Raise the temperature of the water bath to the boiling point over a period of 45 minutes. Within 30 to 60 minutes after the water bath has reached the boiling point, the reaction will take place, raising the pressure to approximately 260 p.s.i.g. Maintain the water bath at the boiling point for another hour during which time the pressure will drop to less than 20 p.s.i.g. Cool and open the pressure vessel. The product will be a semi-solid. Transfer the contents to a 400 ml. breaker. The product will have a weight of approximately 212 grams. Add 300 ml. benzene and heat the mixture to the boil. The product will be totally dissolved, giving a clear colorless solution. Cool to about 8° C. and separate the crystals by vacuum filtration on a Buchner funnel. Wash the crystals with 100 ml. cold benzene. Continue drawing air through the mass for a few minutes and air dry the product. Alternatively, the product may be recrystallized from a mixture of 50% ethyl alcohol and 50% water, drying the product in a vacuum desiccator over anhydrous calcium chloride. The product will be pure white in color, sharply crystalline, having a melting point of 58.5°–59.0° C. A yield of 150 to 160 grams of pure N,N-bis(2-hydroxyethyl) 3,4 xylidine will be attained.

EXAMPLE II

Following the method of Beringer and Ugelow J.A.C.S. 75 2635 (1953) prepare 3,4,5 trimethyl aniline. This procedure uses the route: isophorone; isophorone oxime; 3,4,5 trimethylacetanilide; 3,4,5 trimethyl aniline. Distill the crude amine at atmospheric pressure and collect the fraction distilling between 242°–245° C. Recrystallize the produce twice from hexane to give colorless needles, 79.5°– 80.0° C.

What is claimed is:
1. The compound of the formula:

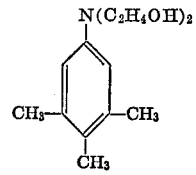

References Cited
UNITED STATES PATENTS

| | | | |
|---|---|---|---|
| 2,805,998 | 9/1957 | Cantrell | 260—573 X |
| 3,044,991 | 7/1962 | Mueller et al. | 260—573 X |

LEWIS GOTTS, Primary Examiner

C. F. WARREN, Assistant Examiner

U.S. Cl. X.R.

260—89.5 A, 88.7 D, 89.3, 92.8 R, 93.5 R, 94.8, 94.9 CA

UNITED STATES PATENT OFFICE
CERTIFICATE OF CORRECTION

Patent No. 3,799,985         Dated  March 26, 1974

Inventor(s)  WALLACE A. ERICKSON

It is certified that error appears in the above-identified patent and that said Letters Patent are hereby corrected as shown below:

Column 3, Line 13, "ether" should be --either--.

Column 4, Line 26, insert the following paragraph:
--Dissolve the 3,4,5 trimethyl aniline 67.5 (0.5 moles) in 46.2 grams (1.05 moles) ethylene oxide and place in the reactor previously described. Place the reactor in a water bath and bring to 100°C over a period of one hour. Very shortly thereafter the reaction will take place with the pressure reaching a maximum of 160 psig. Dissolve the product in 300 cc benzene and allow to cool to 8°C. Separate the product by filtration, wash with 100 cc cold benzene and air dry. The yield should be 84 grams with a melting point of 95°C. Recrystalize from 50% eth alcohol and 50% water to give an almost colorless product with melting point 95.5° - 96.0°C, N,N-Bis (2 - hydroxyethyl) - 3,4,5 trimethyl aniline.--

Signed and sealed this 16th day of July 1974.

(SEAL)
Attest:

McCOY M. GIBSON, JR.
Attesting Officer

C. MARSHALL DANN
Commissioner of Patents